Figure 1:
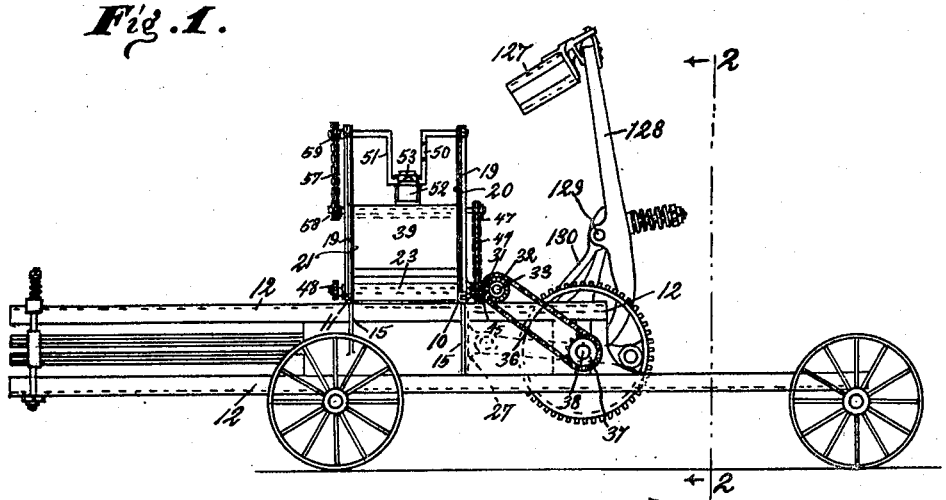

May 6, 1930.  F. NICHOLS  1,756,988
FEEDER FOR BALING PRESSES
Filed April 12, 1927   2 Sheets-Sheet 1

Inventor.
Flowel Nichols.
by
His Attorneys.

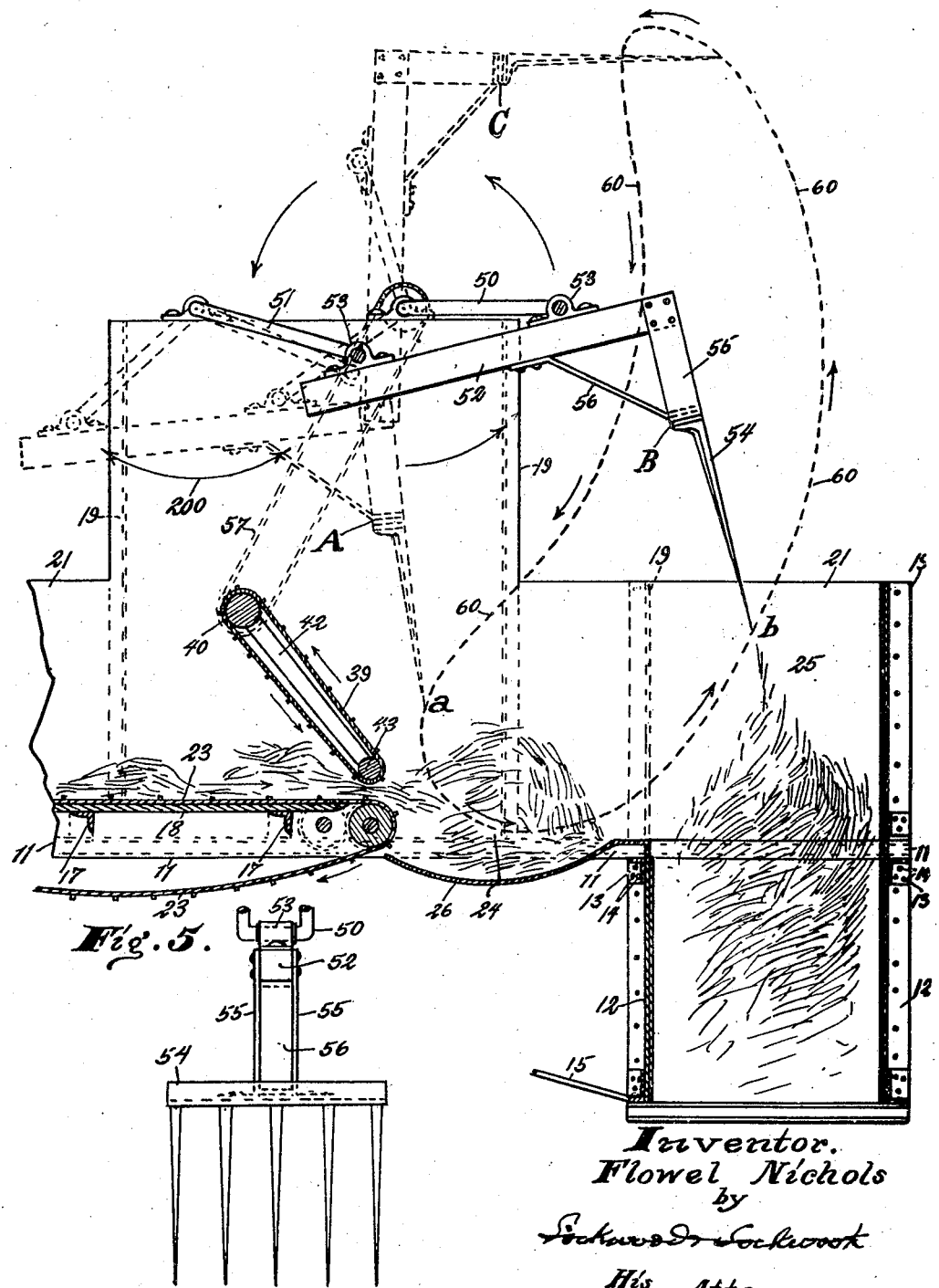

Patented May 6, 1930

1,756,988

UNITED STATES PATENT OFFICE

FLOWEL NICHOLS, OF CHINO, CALIFORNIA

FEEDER FOR BALING PRESSES

Application filed April 12, 1927. Serial No. 183,089.

This invention relates to a feeder attachment for baling presses for baling hay and the like. One object is to provide a mechanical feeder that can be operated automatically to intermittently transfer a charge of material from a false or feed hopper to a press hopper and to operate in timed relation to the press head block. As is well known presses are provided with head blocks that are reciprocated by pitman rods to move material from the hoppers to compression in bales and the purpose of this feeder, as previously indicated, is to intermittently transfer a charge of material from the feed hopper to the press hopper just before the feeder head is actuated and the head block is moved on the compression stroke.

Another object is to accomplish a complete separation of one charge of material from another, or to separate a charge of material in the feed hopper from that being continuously fed toward the feed hopper by a conveyor driven at a slower speed than the fork so that the charge is shifted at great speed from the feed to the press hopper so it will be free from entangling strings of material. This is accomplished by a quick sweeping stroke of the feeder fork which is arranged to first move downward into the material flowing off the discharge end of the apron or conveyor onto the feed hopper, and then in a quick sweeping stroke separate the charge from the conveyor and move it from the feed hopper, into the press hopper. This sweeping movement tears the charge away from the material at the discharge end of the conveyor so that clean, uniform charges of material are intermittently fed to the press hopper.

An object is to increase the efficiency of hay presses by providing a more efficient means for feeding charges of material to them. Heretofore manual means have been principally employed to feed hay presses, which has resulted in irregularity as to the speed and sizes of charges fed to the presses, all of which are detrimental to good, efficient and speedy baling.

Another object is to save time and labor. To that end an automatic feeder is provided that can be operated at a higher rate of speed and more efficiently than manual help, thereby greatly increasing the output of the press.

The chief features of the invention consist in the novel provision of the false or feed hopper beside the regular press hopper, in position to receive and hold a separated bunch or charge of hay which is fed into the press hopper just before the head block starts to operate, whereby no hay hangs out of the press hopper or connects with outside hay or the like; and in the novel mounting of the feeder fork so it will both separate a charge of hay on the feed hopper from the other hay, and will discharge the separate bunch into the press hopper at the right time, the fork or delivering means being operated from the baling press.

The various objects, advantages and features of the invention will appear from the accompanying drawings, the subjoined detailed description and the appended claims.

The accompanying drawings illustrate the invention.

Figure 2:
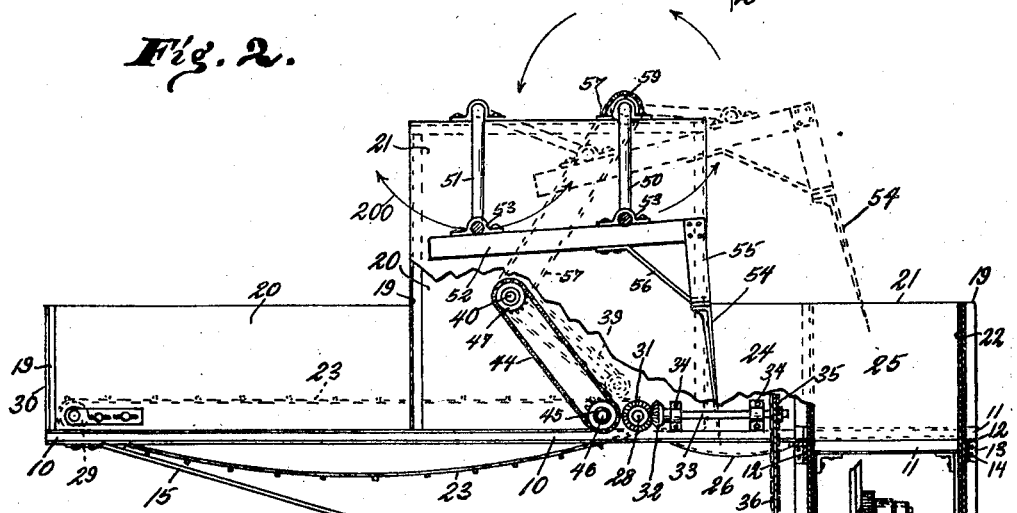
Figure 3:
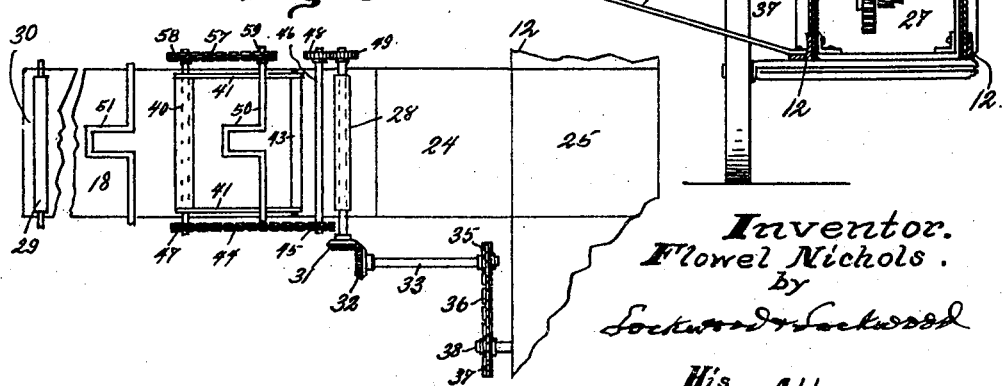

Figure 1 is a semidiagrammatic view of a hay press in side elevation with a feeder attachment connected thereto that is constructed in accordance with this invention. Fig. 2 is an enlarged fragmental cross section of a part of the machine on line 2—2 of Fig. 1, parts broken away to more clearly show the mounting and operation of the feed fork. Fig. 3 is a fragmental semidiagrammatic plan view of the feeder and press showing the means for driving the feeder and conveyor, parts being broken away. Fig. 4 is an enlarged fragmental cross section analogous to the parts shown in Fig. 2, showing in detail the construction and operation of the feeder fork, different positions of the fork and the path of the end thereof being shown by dotted lines. Fig. 5 is a front view of the feeder fork attached to a walking beam.

The feeder attachment is provided with a frame including parallel channel irons 10, 11 that have end portions extended over a hay press frame 12 and secured thereto by brackets 13 and rivets 14 or by any other well known means as by bolts or brazing.

The channel irons 10 and 11 are arranged at right angles to the hay press frame 12, and have their free ends supported by inclined brace rods 15 that are secured to the channel irons and frame, as best shown in Fig. 2. The channel irons 10 and 11 are secured together by cross bars 17 that are preferably angle irons, and a floor 18 is secured to these bars, as best shown in Fig. 4.

Other angle irons 19 are secured to and arranged vertically on the channel irons 10 and 11 and sheet iron sides 20 and 21 and an end plate 22 are secured to the irons 19 so as to form a trough for a conveyor 23, a false or feed hopper 24, and a press hopper 25.

The feed hopper 24 is provided with a sheet iron bottom 26 that is arranged to receive a charge of baling material from the conveyor 23 and positioned so that the charge can be easily slid toward and into the press hopper 25. The hopper 25 has an open bottom so that when a charge of material is discharged therein it will fall into the press in advance of the head block 27, where it will first be acted on by the feeder head 127 and then moved to compression by the head block 27. The operation of the feeder head and head block are old and well understood in the art and, therefore, not shown or described in detail. The feeder here is mounted on the upper end of the arm 128, pivoted at 129 to the frame member 130, and actuated by a cam (not shown) on shaft 38 engaging the lower end of the arm.

The conveyor 23 is mounted on rollers 28, 29 and is driven at intermediate speed so as to convey material at a relatively uniform speed from the open end of the feed trough 30 toward the false hopper 24. A bevel pinion 31 is secured to one end of the roller 28 and is arranged to mesh with a similar pinion 32 on a shaft 33 that is mounted in bearings 34 secured to a side of the conveyor trough. A sprocket wheel 35 is secured to the shaft 33 and is connected by a chain 36 to a sprocket wheel 37 secured to the shaft 38 on which the drive shaft for the press head block 27 is mounted so that by means of the driving connection mentioned the conveyor 23 will operate in timed relation to the movement of the head block 27.

A draper 39 is mounted above the discharge end of the conveyor 23 and arranged to move in time therewith. This draper is pivoted on an upper roller 40 that has its ends journaled through the sides 20 and 21. Pivotally mounted on the roller 40 are downwardly extending bars 41 and 42 that have a roller 43 mounted on their lower free ends, and these rollers carry the draper 39 (see Figs. 2, 3 and 4). The roller 40 is driven by a sprocket chain 44 that connects a sprocket wheel 45 on the jack shaft 46 with a sprocket wheel 47 on the roller 40, and the jack shaft 46 is driven by a spur gear 48 meshing with a similar gear 49 on the roller 28 (see Fig. 3).

The draper 39 is driven at about the same speed as the conveyor 23, and has its lower end arranged to ride on the material carried by the conveyor so that its weight is directed toward the discharge end of the conveyor to hold the hay or straw back when the stroke of the fork 54 is made to deliver a charge of material from the feed to the press hopper.

A pair of cranks 50 and 51 are mounted on the upper edges of the sides 20 and 21 and pivotally connected to a walking beam 52 by straps 53. A fork 54 is connected to one end of the walking beam by straps 55 and a brace 56 and arranged so that in operation the tines of the fork will pick up a charge of material from the feed hopper 24 and move it in a quick sweeping stroke into the press hopper 25.

The fork 54 is actuated by a chain 57 that connects a sprocket wheel 58 on the roller 40 with a sprocket wheel 59 on the crank 50. The arms of crank 51 are considerably longer than the arms of crank 50, so that crank 51 does not revolve as does the driven crank 50, but rocks or oscillates in an arc 200. The revolving crank 50 and the swinging crank 51 cooperate to cause the fork 54 to move in an irregular ellipse 60, as indicated by the dotted lines 61 in Fig. 4, when cranks 50 and 51 are moved, as indicated by the arrows in Figs. 2 and 4.

As illustrated the points of the fork tines, when approaching the feed hopper 24 and moving toward the press hopper 25, are moved in a sweeping arc $a-b$, which will cause the fork to enter a charge of material on the bottom 26 of the false hopper 24 and then with a stroke of great speed and force transport it to the press hopper 25, where the charge is released by a rather abrupt upward movement of the fork.

The gearing connecting the driving shaft 38 with the fork 54 for actuating it is geared so that the fork will operate one time during each operation of the head block or baling press, and also so that the fork will deliver the charge of material into the press hopper of the baling press immediately before the feeder head 127 enters the press hopper for tamping the material, and which occurs immediately before the head block 27 begins to move for pressing the bale.

The draper 39 is so arranged that its free end weighted by the roller 43 aids in holding back the material on the conveyor 23 when the fork 54 tears away the charge of material from the feed hopper so that the charge is delivered to the press hopper 25 practically free of ragged strings.

Full line and dotted line positions of the fork 54 and associated parts are shown in Fig. 2, one position of the fork being midway in the feed hopper while getting a charge and another position at the normal point of discharging the charge into the hopper 25. In Fig. 4 three positions of the fork and associated parts are shown. The dotted position A shows the fork approaching and entering a charge of material on the feed hopper 24; the full line position B shows the fork just after the charge has been dropped into the hopper 25; and the dotted position C shows the fork near the limit of its upward stroke.

In operation, material, such as hay, straw, or the like, by either manual or automatic means well understood in the art, is thrown onto the conveyor 23 which is driven, as described, to convey and discharge the material into the feed hopper 24 where it accumulates in a bunch or charge as the fork 54 travels over the irregular course or ellipse 60.

The cranks 50 and 51 are of much greater radial length than the radius of the bevel gears 31 and 32 and driving gears of the draper 39 so that the fork travels at a much greater speed than the conveyor and draper when the apparatus is in operation, so that the fork readily and clearly tears a charge from the material between the discharge ends of the draper and conveyor. That is, the material is moved relatively slow to the feed hopper and with great speed from the feed hopper into the press hopper.

The invention is not limited to the details herein shown illustrating the preferable construction to be employed, as the broadest feature of the invention consists in providing means for delivering separated charges, one at a time, to the baling press and in timed relation with the operation of the pressing means of the baling press. The fork construction may be modified in form and operating means so long as the tines thereof move in the arcuate direction indicated at the lower part of the dotted line 60 for discharging a bunch or charge of material into the hay press and operates in timed relation with the feeder head or head block. Also while the conveyor feeding attachment herein shown is preferably for a substantially continuous feed of material to the feed hopper and fork, it may be omitted if desired and, likewise, the draper, but they are preferably not only for a substantially continuous feed of material to the feed hopper, but for relatively holding the material between the draper and the conveyor while the quick movement of the fork is separating the charge in the feed hopper from the material between the conveyor and draper.

I claim as my invention:

1. A feeder for a baling press, including a conveyor driven at an intermediate speed to continually move material toward a bale press, a fork, means for mounting and moving said fork at high speed in an irregular ellipse toward and from the baling press for intermittently separating and delivering a charge of material from said conveyor to said baling press, and means actuated by the baling press for operating said conveyor and fork moving means.

2. A feeder for a baling press including a feed hopper located beside the baling press and from which a charge of material may be delivered to the baling press, a conveyor driven at intermediate speed for conveying material to the feed hopper, a draper driven at the same speed as said conveyor and coacting with it, said draper arranged so that its free end is forced by gravity toward the discharge end of said conveyor, and a fork for intermittently separating the material in the feed hopper from the material held by said conveyor and draper and delivering it in a high speed sweeping stroke to the baling press.

3. A feeder for a baling press including a feed hopper located beside the baling press, a substantially horizontal conveyor for continuously conveying material toward the feed hopper, a draper cooperating with the inner end of said conveyor, and a fork mounted and operated so as to move at a faster speed than the conveyor and draper for intermittently separating a charge of material in the feed hopper from the material between the conveyor and draper and delivering it to the baling press.

4. A feeder for a baling press including a feed hopper located between a conveyor and baling press, a fork consisting of a straight beam arranged over and parallel with the conveyor and with tines projecting angularly therefrom, a crank to which the forward end of said fork beam is pivoted, another crank to which the rear end of said fork beam is pivoted, means adapted to be driven by the baling press for revolving said forward crank so as to cause the rear crank to swing in an arc and give to the fork in the lower part of its movement a thrust into the charge of material and then an arcuate movement through the feed hopper towards the baling press and a subsequent upward movement to disengage the fork from the material so as to deliver the charge to the baling press.

In witness whereof, I have hereunto affixed my signature.

FLOWEL NICHOLS.